US 6,479,179 B1

(12) United States Patent
LaFollette

(10) Patent No.: US 6,479,179 B1
(45) Date of Patent: Nov. 12, 2002

(54) SOURCE OF ELECTRICAL POWER FOR AN ELECTRIC VEHICLE AND OTHER PURPOSES, AND RELATED METHODS

(75) Inventor: Rodney M. LaFollette, Provo, UT (US)

(73) Assignee: Bipolar Technolgies Corporation, Provo, UT (US)

( * ) Notice: Subject to any disclaimer, the term of this patent is extended or adjusted under 35 U.S.C. 154(b) by 0 days.

(21) Appl. No.: 09/477,975

(22) Filed: Jan. 5, 2000

Related U.S. Application Data

(62) Division of application No. 08/974,848, filed on Nov. 20, 1997.

(51) Int. Cl.⁷ .............................................. H01M 4/04
(52) U.S. Cl. .................... 429/33; 429/228; 429/242; 429/243; 29/623.1
(58) Field of Search .................... 29/623.1; 429/233, 429/50, 228, 242, 243

(56) References Cited

U.S. PATENT DOCUMENTS

| 266,089 | A | * | 10/1882 | Brush | |
| 749,185 | A | * | 1/1904 | Hager | |
| 2,571,616 | A | * | 10/1951 | Ruben | |
| 2,665,325 | A | * | 1/1954 | Welter | |
| 3,904,433 | A | * | 9/1975 | Frazier | 136/14 |
| 4,046,642 | A | * | 9/1977 | Edwards | 204/2.1 |
| 4,121,019 | A | * | 10/1978 | Garrett, Jr. | 429/94 |
| 4,158,300 | A | | 6/1979 | Hug et al. | 72/148 |
| 4,289,385 | A | * | 9/1981 | Lee | 429/50 |
| 4,345,987 | A | * | 8/1982 | Fukasawa et al. | 204/290 R |
| 4,411,969 | A | * | 10/1983 | Sundberg | 429/50 |
| 4,656,706 | A | * | 4/1987 | Mahato | 29/2 |
| 4,707,911 | A | * | 11/1987 | Kober et al. | 29/623.5 |
| 4,709,472 | A | | 12/1987 | Machida et al. | 29/623 |
| 5,045,086 | A | * | 9/1991 | Juergens | 29/623.1 |
| 5,091,273 | A | | 2/1992 | Hug et al. | 429/94 |
| 5,252,105 | A | * | 10/1993 | Witherspoon | 29/623.1 |
| 5,314,766 | A | * | 5/1994 | Witherspoon | 429/227 |
| 5,323,527 | A | | 6/1994 | Ribordy et al. | 29/623.1 |
| 5,487,981 | A | * | 1/1996 | Strangways et al. | 429/223 |
| 5,510,213 | A | * | 4/1996 | Gagnon | 429/225 |
| 5,536,598 | A | | 7/1996 | LaFollette | 429/210 |
| 5,544,681 | A | * | 8/1996 | Feldstein | 141/1.001 |
| 5,585,209 | A | * | 12/1996 | Feldstein | 429/210 |
| 5,626,989 | A | * | 5/1997 | Doundoulakis | 429/233 |
| 6,063,525 | A | * | 5/2000 | LaFollette | 429/233 |

FOREIGN PATENT DOCUMENTS

CA 936228 * 10/1973

OTHER PUBLICATIONS

A Method of Producing Strong Magnetic Fields. Proceedings of the Royal Society of London, vol. 105, p. 691 (1924).

* cited by examiner

Primary Examiner—Patrick Ryan
Assistant Examiner—Mark Ruthkosky
(74) Attorney, Agent, or Firm—Lynn G. Foster

(57) ABSTRACT

Microthin sheet technology is disclosed by which superior batteries are constructed which, among other things, accommodate the requirements for high load rapid discharge and recharge, mandated by electric vehicle criteria. The microthin sheet technology has process and article overtones and can be used to form corrugated thin electrodes used in batteries of various kinds and types, such as spirally-wound batteries, bipolar batteries, lead acid batteries, silver/zinc batteries, and others. Superior high performance battery features include: (a) minimal ionic resistance; (b) minimal electronic resistance; (c) minimal polarization resistance to both charging and discharging; (d) improved current accessibility to active material of the electrodes; (e) a high surface area to volume ratio; (f) high electrode porosity (microporosity); (g) longer life cycle; (h) superior discharge/recharge characteristics; (i) higher capacities (A·hr); and (j) high specific capacitance.

22 Claims, 7 Drawing Sheets

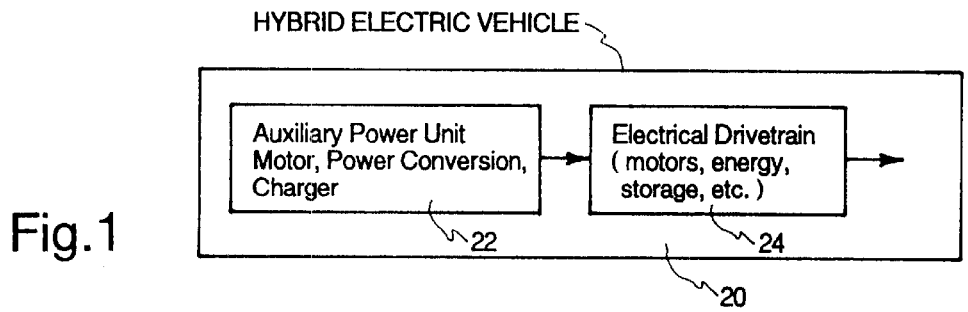

Fig.1

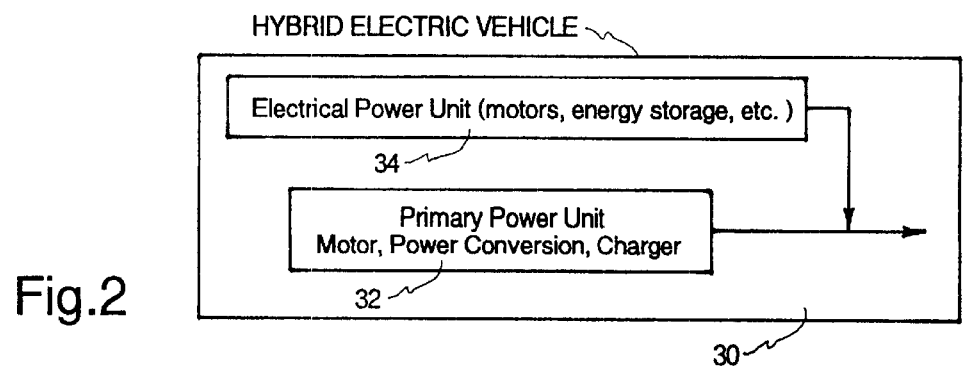

Fig.2

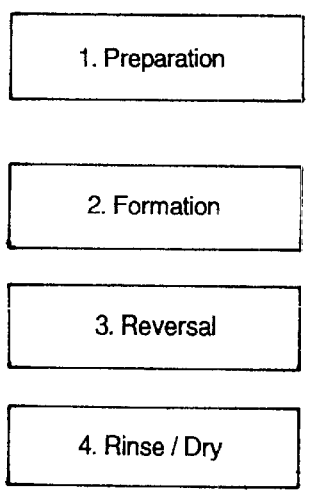

1. Preparation
   a. Place Thick Flat Electrode Blank in Forming Tank
   b. Tank Set-Up ( Solution Composition, Connections )
   c. Run High Short Term Oxidizing Current 2. Formation
   a. Long Term Oxidizing Current
      ( 1 A per A hr of Rated Capacity )

3. Reversal
   a. Long Term Reducing Current
      ( 1 A per A hr of Rated Capacity )

4. Rinse / Dry
   a. Remove Electrodes from Tank
   b. Rinse in De-ionized Water
   c. Air-Dry Fig. 4 Conventional Flat Electrode Planté Formation Processing

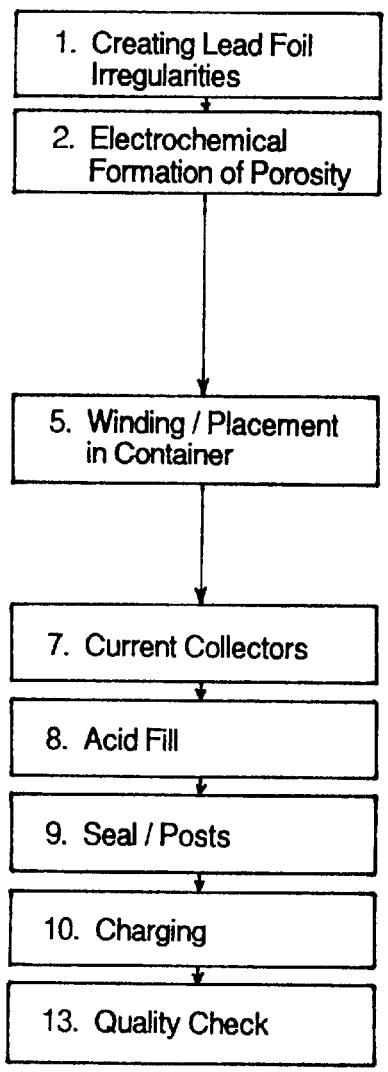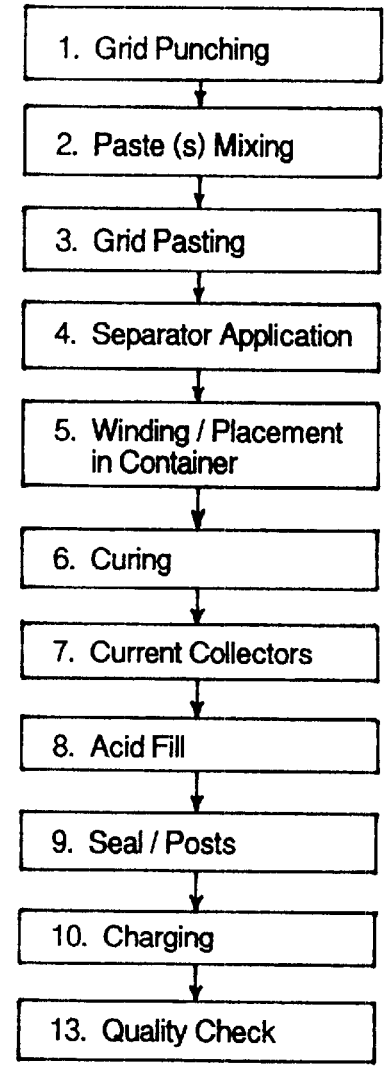
Fig. 3  Comparison of Present Spiral Process and Pasted Electrode Process

SOURCE OF ELECTRICAL POWER FOR AN ELECTRIC VEHICLE AND OTHER PURPOSES, AND RELATED METHODS

This application is a division of my co-pending U.S. patent application Ser. No. 08/974,848, filed Nov. 20, 1997.

GOVERNMENTAL SPONSORSHIP

This invention was made with government support under Contract No. BE-AC-36-03CH1009 awarded by the Department of Energy. The Government has certain rights in this invention.

FIELD OF INVENTION

The present invention relates to electrical batteries in general and more particular to improved sources of electrical power for an electric vehicle and other purposes, and related methods.

BACKGROUND

In its most elemental way, a source of electrical power is typically a battery which may comprise one or more battery cells. Each cell typically comprises encapsulized electrolyte and positive and negative electrodes. During cell operation, electrons move through the solid electrode material, to the electrolyte/electrode interface. There, a faradaic (charge-transfer) reaction occurs, which transfers the charge from electrons to electrolyte species. Ions then flow through the electrolyte to the opposite electrode, where another faradaic reaction takes place, liberating electrons into the solid electrode material. Electrons then flow from the electrode to the external load connected to the battery.

Because of a number of fundamental deficiencies, including but not limited to ionic resistance and electronic resistance within the cell, prior battery technologies have proven to be unsatisfactory for high discharge and high recharge power requirements including those imposed in the operation of an all-electric or hybrid electric vehicle. Electric vehicles typically take the form of parallel-configured and series-configured vehicles.

Parallel-configurated electric vehicles require a battery pack which is smaller in size, and yet can be both discharged and recharged at rates comparable to those specified for the series-configured hybrid. No battery presently available can approach the power requirements (especially charging power) for the parallel-configured hybrid vehicle.

The limitations in power are not necessarily due to the fundamental electrochemistry of the battery systems, but instead are often due to certain design constraints of the batteries, particularly the electrodes. Among the design constraints of prior battery packs for electric vehicles are:

excessive solid-phase resistance to electronic current flow;

excessive electrolyte-phase resistance to flow of ionic current within the electrode; and excessive kinetic resistance in the electrode, caused at least partially by the nature of electrode surface area.

Prior spiral lead acid batteries often perform better at high rates than prismatic (parallel-plate) batteries. Still, the performance of prior spirally-wound lead-acid cells is not adequate for many load-levelling applications requiring high rate charging and discharging, such as hybrid electric vehicles.

Prior silver-zinc batteries each consists of a zinc electrode (the negative), a silver-oxide electrode (the positive), and an alkaline electrolyte. Each electrode is supported by some conductive grid. Numerous materials have been used, and zinc metal (for the negative) and silver metal (for the positive) are common. In the fully-charged state, the negative consists of zinc metal (usually porous), and the positive of AgO ($Ag_2O$ is also used). The discharge reactions involve

$Zn \rightarrow ZnO$ $AgO \rightarrow Ag_2O \rightarrow Ag$.

The open circuit potential of the fully-charged prior cell is around 1.83 V, depending on the electrolyte (KOH) concentration. This battery is the highest-energy density battery using an aqueous electrolyte. It is also capable of high power density. Cycle life is short due to the solubility of both zinc and silver, and the aggressive action of silver on separator materials. The cost is obviously high, such that its application is usually limited to military and aerospace purposes, where energy density is of primary importance, and cost is not.

Spiral wound lead acid batteries are known wherein electrodes are made by applying appropriate pastes to a lead or lead alloy grid, and curing the paste to form the electrode active materials. Pastes are composed of lead oxides, sulfuric acid, and other components. The compositions will vary depending on the vendor. Cells are made by placing separators between the pasted electrodes and rolling the electrodes and separators into a coil. The separator material is usually compressed during cell winding. Consequently, the space between electrodes is conveniently made small, which provides somewhat lower internal cell resistance.

Spaced rectangular flat plate electrodes in lead acid are also known, which are made by the so-called Planté process. This process originally involved the simple electrochemical oxidation of lead metal in sulfuric acid. The resultant capacity of the electrodes was low, but gradually increased as the cells were charged and discharged. The resulting electrodes proved very durable, but suffered from low specific capacity ($A \cdot hr/cm^2$).

Later improvements allowed for increased capacity. The first was the addition of lead-solubilizing agents[2] (such as $KClO_4$, $KClO_3$, HCl, $HNO_3$, and $H_2C_2H_3O_2$) to the sulfuric acid formation solution. The use of these agents resulted in more rapid and deeper penetration of the corrosion layer on the flat electrode plates during oxidation leading to higher specific capacity. The second was the mechanical working of the lead to increase surface area, such as by creating lead ridges on the flat electrode plates. This further increased the electrode capacity.

During the early part of this century, Planté electrodes were gradually replaced by pasted electrodes for most energy storage applications, due to the higher specific capacity, and despite the shorter life expectancy. Planté electrodes are still used commercially in applications where long life is paramount, especially stationary applications (such as stand-by power). A number of manufacturers still produce Planté batteries in the 100–2000 A·hr range and the U.S. Department of Defense uses Planté batteries for some stand-by power supply applications where long life is needed. The principal advantage of Planté batteries is in their stability. It is not uncommon for Planté batteries to have a useful life of decades.

The processing of Planté flat plate batteries are typically costly and time intensive compared to pasted electrode batteries. Flushing of potassium perchlorate adds significantly to the time and cost requirements.

BRIEF SUMMARY AND OBJECTS OF THE INVENTION

In brief summary, the present invention overcomes or substantially alleviates electrical power source problems of the past in the field of electrically-driven vehicles and in other fields as well. Microthin sheet technology is provided by which batteries are constructed which accommodate the requirements for high load rapid discharge and recharge, mandated by electric vehicle criteria. The exceptional characteristics of batteries made according to this invention accommodate cost-effective use for many other purposes as well. The microthin sheet technology can be used to form batteries of various kinds and types, such as spirally-wound batteries, bipolar batteries, lead acid batteries, silver/zinc batteries and others.

The micro thin sheet technology embraces one or more of certain basic characteristics, i.e. enhanced power and capacity due to: (1) the thinness of the electrode-forming sheet; (2) the high degree of active (corroded) material created on the sheet; (3) the presence of undulations, corrugations, or up and down irregularities in the sheet; (4) the spiral orientation of positive and negative separated thin sheet electrodes; (5) the combination of the thin sheet technology to bipolar battery technology; (6) implementation of microcorrugations or micro-irregularities in a thin sheet of foil; (7) the creation of a greater amount and greater depth of active material on a thin sheet electrode; (8) provision of electrochemically-caused high microporosity in a thin sheet electrode; (9) facilitating a high degree of electrolyte accessibility to electrodes; (10) elimination of the need to and costs associated with rinsing metal solubilizing agent from pores in thin metal sheets for use as battery electrodes; (11) concurrent and conjoint formation of positive and negative electrodes; (12) use of thin sheet electrode-to-tab-to-terminal technology; and (13) thin sheet bipolar battery technology.

Superior high performance battery features are achieved by the present invention due to one or more of the following: (a) minimal ionic resistance; (b) minimal electronic resistance; (c) minimal polarization resistance to both charging and discharging; (d) improved current accessibility to active material of the electrodes; (e) a high surface area to volume ratio ($cm^2/cm^3$); (f) high electrode porosity (microporosity); (g) longer life cycle; (h) superior discharge/recharge characteristics; (i) higher capacities (A·hr); (j) high specific capacitance ($C/cm^2$); (k) the microthinness of the electrode sheets; (l) use of a spiral cell array.

Other advantages are derived from the present invention including but not limited to costeffective manufacturing, use of mass production techniques, reduction in time required to manufacture, lower initial capital outlays, superior quality, modest floor space requirements and ease of production.

With the foregoing in mind it is a primary object to overcome or alleviate past problems in the field of electrical power sources for electrically-propelled vehicles and in other fields as well.

It is a further dominant object to provide batteries and methods of making batteries which comprises the novel thin sheet technology of the present invention.

Another important object is the provision of batteries and methods of making batteries which accommodate high load rapid discharge and recharge utilization.

Still another paramount object is the provision of spirally-wound, bipolar lead-acid, silver/zinc, and other batteries which have superior characteristics due to use of the novel microthin sheet technology of the present invention.

A further object of value is provision of batteries and methods of making batteries comprising one or more of the basic characteristics and/or the features and/or advantages mentioned above.

Another object of the invention to provide an electrode with the durability and long life of prior Planté electrodes, but comprised of a thin sheet with a higher capacity and lower cost of manufacture as compared to prior Planté electrodes.

It is also an object of the invention to provide, in a battery, thin sheet highly corroded electrodes having high and low surface irregularities.

Another object is the provision in a battery of thin sheet, spirally-configurated highly corroded electrodes.

An object of importance of the invention is to provide thin sheet, highly corroded electrodes in a bipolar battery.

It is further an object of the invention to provide highly corroded thin sheet electrodes in spirally-wound lead acid batteries.

An object of significance is to provide thin sheet corroded electrodes having high and low surface irregularities in bipolar lead-acid batteries.

Yet another object of the invention is to provide thin sheet corroded electrodes having high and low surface irregularities in silver/zinc batteries.

A further object of the invention is to provide novel electrodes in bipolar silver/zinc batteries.

Yet an important object of the invention is to provide novel corroded electrodes having high and low surface irregularities in spirally-wound silver/zinc batteries.

Another object of the invention is to provide microthin sheet highly corroded electrodes with enhanced microporosity.

A further object of the invention is to provide a novel process for manufacturing silver/zinc batteries.

A further object of the invention is to provide novel microthin sheet electrodes in spirally-wound batteries.

Yet another object of the invention is to provide novel microthin corroded sheet electrodes in bipolar batteries.

Another object of the invention is to provide a process for providing surface irregularities in corroded lead foil for use in battery electrodes.

A further object of the invention is to provide a process for the rapid filling of spirally-wound cells that comprise corrugated thin sheet electrodes.

Yet another object of the invention is to provide spirally-wound lead acid battery with novel thin sheet corroded electrodes.

Another important object of the invention is to provide in situ formation of thin sheet corroded electrodes in spirally-wound cells.

A further object of the invention is to provide a process for in situ formation of thin sheet electrodes in bipolar cells.

Yet another object of the invention is to provide a battery with a thin corrugated lead foil electrode with an improved life cycle.

An object of the invention is also to provide a battery with improved discharge/recharge properties.

A further object is to provide novel thin sheet electrodes that minimize the various resistances in the electrode structure.

Further objects of the invention will become evident in the description below.

BRIEF DESCRIPTION OF THE DRAWINGS

FIG. 1 is a diagrammatic representation of a series-connected hybrid electric vehicle;

FIG. 2 is a diagrammatic representation of a parallel-connected hybrid electric vehicle;

FIG. 3 is a flow chart comprising one spiral battery process of the present invention with the conventional pasted electrode process;

FIG. 4 is an expanded flow sheet of a portion of the convention flat electrodes Planté formation process;

DETAILED DESCRIPTION OF THE ILLUSTRATED EMBODIMENTS

Figure 5:
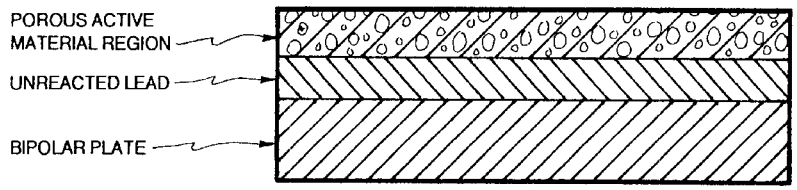
FIG. 5 is a cross-sectional schematic of a convention prior art Planté formed bipolar flat plate electrode.

The present invention is directed towards significant improvements in batteries by which, among other things, electric vehicles can be satisfactorily operated for a protracted time, without encountering debilitating discharge and recharge problems. The present invention has a broad range of applications which includes but is not limited to provision of sources of electrical power for electric vehicles.

With reference to FIG. 1, an electric vehicle 20 is diagrammatically illustrated. Vehicle 20 is characterized as being "hybrid" because it contains two power sources, i.e. (1) an internal combustion engine, comprising part of the auxiliary power unit 22, and (2) an electrical power source, comprising part of the electrical drive train 24. Because the unit 22 and drive train 24 are arranged in series, the hybrid electric vehicle (HEV) 20 is called a "series-connected hybrid electric vehicle."

With reference to FIG. 2, an electric vehicle 30 is diagrammatically illustrated. Vehicle 30 is characterized as being "hybrid" because it contains two power sources, i.e. (1) an internal combustion engine comprising part of the primary power unit 32 and (2) an electrical power source, comprising part of the electrical power unit 34. Because the units 32 and 34 are arranged in parallel, the HEV 30 is called a "parallel-connected hybrid electric vehicle." The electrodes of the invention rely on thin sheet technology which surprisingly minimizes the various resistances heretofore consistently found in the prior electrodes.

In traditional prior lead acid electrode technology, batteries have not been produced having a high rate load-leveling capability, such as is needed in HEV. Consequently, lead acid batteries heretofore suffered rapid loss of capacity under such rigorous use. The electrodes of the present invention provide batteries which can operate at very high power levels and for long periods of time. They can be recharged in no more than a few minutes. Principles of the present invention include but are not necessarily limited to:

1. Active material regions of improved depth having minimal ionic resistance, i.e. reduction in the electrolyte-phase resistance to flow of ionic current within the electrode;
2. Active material regions of improved depth having minimal electronic resistance, i.e. reduction in the solid-phase resistance to electronic current flow;
3. The chemical reactions of minimal polarization resistance (during both charging and discharging); and
4. Low capacity losses by minimizing morphological changes during operation.

Polarization is the reduction in cell voltage that occurs due to electrode reactions. It is related to the energy required to drive the reactions. It is reported in volts. Some electrode reactions occur more readily than others. For example, nickel is a sluggish electrode, such that voltage drops of 0.1–0.5V can occur at that electrode when high rate discharges are attempted. By contrast, certain lead oxide or lead electrodes can be discharged at similar rates and only suffer a polarization of tens of millivolts. Obviously, if high rate operation is to be obtained from a battery, then electrode materials must be used that will not have prohibitively large reaction polarization losses. Electrode reactions do not necessarily occur with the same rate on charge and discharge. Some, for example, are easier to discharge at high rates than to recharge at high rates. The lead dioxide electrode, used in a lead-acid battery, is an example of such asymmetric reactive capabilities. It recharges with more difficulty than it discharges.

The high performance electrodes of thin corroded sheets with high and low surface irregularities according to this invention have been used in lead acid batteries and found to possess the characteristics mentioned above. The batteries of the invention comprise microthin electrode layers within the range of 4–62 mils comprised of a high surface area within the range of 10,000 to 50,000 $cm^2/cm^3$, porosity within the range of 5–95%, depending on intended application, including to a far greater depth, and minimal electronic resistance. Sometimes internal resistance of a battery pack is expressed as "stack impedance." Stack impedance is mainly due to voltage drops occurring inside of individual cells (due to ohmic resistances and chemical reaction resistance) and voltage drops as current flows through various current collectors and conductive straps and connections in the battery pack. Restated, the stack impedance is mostly due to the internal cell resistances. The more efficient the cell, the lower the internal resistance. The present invention minimizes these resistances, resulting in a materially lower stack impedance. A modified process, constituting several improvements over the traditional Planté process, has been found to be a cost-effective and convenient way of making such electrode structures. The surface irregular microthin electrode sheets have been developed to maximize the specific capacity by increasing the ratio of active (corroded) material to support material. Specific electrode capacities can range from 1–45 C/cm$^2$ and higher. "Specific capacity is a measure of charge (Coulombs or ampere-hours) which can be stored per given area of electrode face (cm$^2$). Traditional Planté electrodes historically have been thought of as having low specific capacity relative to the more common pasted electrodes. The present technology has resulted in microthin electrodes which have specific capacity compable to those of pasted electrodes, but with much better high power capability. Useful life in years is improved.

The microthin electrode construction begins by forming the surface irregularities in the thin sheet. This can be done by cutting parallel grooves in metal foil, by die-stamping a desired high and low repeating or random pattern in the microthin sheet or in any other suitable way. As stated, the thin electrode sheet is within the range of 4–62 mils. The height and depth of the high and low surface regions, is typically within the range of 2–20 mils and the width of high and low irregular surface areas is typically within the range of 2–20 mils.

When grooves and ridges comprise the high and low surface irregularities, center-to-center spacing between consecutive grooves and consecutive ridges, respectively, may be within the range of 4–40 mils. For lead acid microthin electrodes, lead foil may be used as a starting material for the electrode. A large number of microscopic, parallel grooves, for example, may be cut into the soft lead foil, usually on both sides. One way of creating such parallel grooves in a thin smooth sheet is by passing the sheet through a rolling machine, whose rollers are equipped with teeth by which the grooves are formed, much as a farmer can create furrows in a field by discing. Another method which can be used is to cast lead into the desired thin corrugated or irregular form using, for example, a conventional continuous caster. In situ formation is also satisfactory. Other suitable thin electrode processes may be used for lead and other thin electrode metals, such as silver and zinc, to form surface irregularities.

Figure 7:
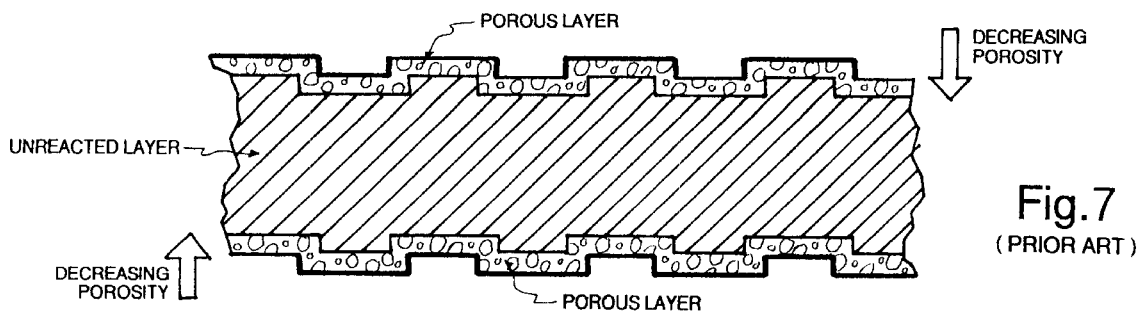
FIG. 7 is a cross-sectional schematic of a conventional slotted prior art Planté formed flat lead plate electrode.
Figure 9:
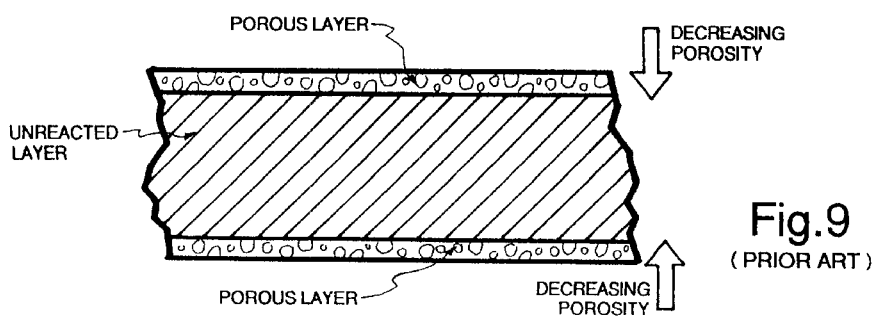
FIG. 9 is a cross-sectional schematic of a conventional prior art Planté formed flat lead plate electrodes without slots.
Figure 10:
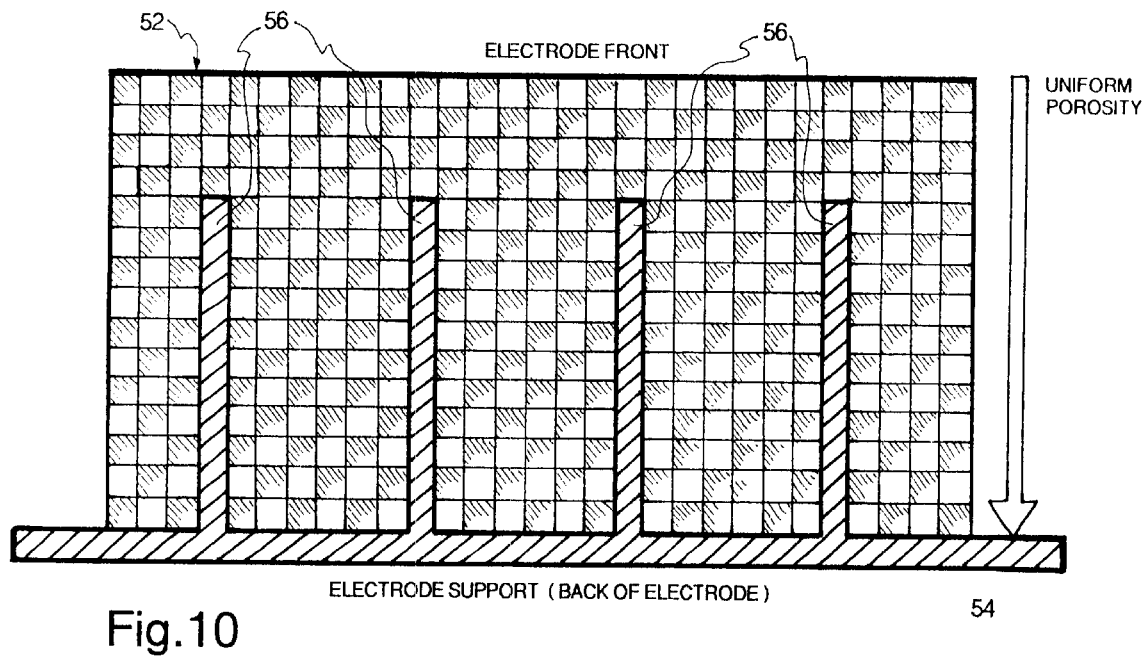
FIG. 10 is a cross-sectional schematic of a thin sheet electrode formed from blank of FIG. 8 by implementation of principles of the present invention.

The electrode is next electrochemically formed from the thin sheet comprising at least one and normally both irregular surfaces comprising high and low regions. Specifically, the thin irregular sheet is electrochemically oxidized by placing the sheet in a chemical bath and subjecting it to current flow. For lead metal, this has conventionally been done in the past, as depicted in FIG. 10, using relatively thick metal plates in a sulfuric acid solution containing potassium perchlorate as a lead-solubilizing agent. Large grooves, in millimeters, have sometimes been placed in the thick plates subjected to the Planté process, as shown in FIG. 7. Conventional thick Planté electrodes have active material regions which have an effective useful thickness of only a few mils. This is due to the fact that the porosity of the active material decreases with thickness. At the front (outside) of the active material region (as shown in FIGS. 7 and 9) porosity is often above 50%. However, the porosity can be under 10% for very thick Planté active material regions. Consequently, the underlying active material in the thick Planté electrodes is only poorly accessible to electrolyte, due to the low porosity.

The present invention relies on microthin sheets and nitric acid in lieu of perchlorate because extensive rinsing is not required, as explained in greater detail hereinafter. The formation of a porous lead dioxide region results from this process, which can be used as a positive electrode, or by subsequent electrochemical reduction to porous elemental lead, as a negative electrode. The Planté process has been limited to creating flat or substantially flat planar and thick electrodes, not spiral or bipolar electrodes or electrodes which are microthin.

An aspect of the present invention is the use of a novel and improved battery chemistries to oxidized microthin sheet metal electrodes, other than lead/lead oxide systems. For other metals, the electrochemical oxidation is done with current flow in an appropriate electrolyte (typically acidic or basic), which contains a commercially available metal-solubilizing agent. After oxidation, the corrosion or active portions of the thin sheet electrode may be subjected to an electrochemical reduction in the same or similar agent to convert the active portions from an oxidized state to the porous elemental metal, where a negative electrode is being formed.

Another aspect of the invention is the incorporation of thin electrodes, formed in accordance with the present method, for either one of both of the electrodes in a cell.

The present invention has a scope where only one of two electrodes in a battery cell is constructed in accordance with the present invention. For example, a thin sheet positive electrode formed in accordance with the principles of the present invention could be used in conjunction with a traditional pasted negative electrode to provide a viable battery.

As the oxidation proceeds, a surprisingly large porous oxide layer grows on the irregular metal surfaces of the thin sheet electrode. The depth of the corrosion layer is significant, but depends on the oxidation time, current density, and other factors that are within the ability of the practitioner to determine with no more than routine experimentation. The electrochemical formation continues long enough to create an active region of substantially uniform corrosion and of adequate depth. The depth can be substantial and greater than the dimensions of the underlying untreated metal. Preferably, the width of the lead ridges or other high regions is chosen such that while both sides and the top are corroded, a small portion of unreacted lead remains inside each ridge or high region (under the porous region), and provides mechanical support. However, the thin sheet may be composite, particularly in bipolar batteries, so that the untreated support region is formed of a conductive material different from the corroded material at or near the surface The width of the grooves or low regions is sufficient to allow for expansion from formation of porous active material along the sides of the ridges and at the bottom of the grooves or low regions. See FIG. 10. In some embodiments the grooves form flow paths for rapid dissemination of electrolyte. The grooves or low regions serve, in some configurations, as reservoirs for electrolyte. The grooves can also contain gas and/or separator material. In some cases, gas volume can be significant. The capacity is thus increased, due to improved accessibility of the electrolyte to the active material and to the current flow.

Capacity is also improved due to surprisingly high overall porosity in the active regions. The porosity of the active regions of lead acid cell electrodes (porous lead dioxide or porous elemental lead) is naturally-stable and within the range of 5–65% depending upon the intended application. This porosity is best characterized as "microporosity." With corrugated or irregular thin sheet electrodes, the grooves or low regions also contribute to the porosity. Porosity is electrochemically created "pores," in the high and low irregular surface or surfaces of the thin sheet electrode. These micropores can provide effective stable apparent porosity values of 70 to 80% in some configurations of the invention. In some cases, the degree of oxidation of corrugate or otherwise irregular surfaces of the thin sheet can fill or substantially fill the grooves or other low regions, as depicted in FIG. 10.

A further benefit of the corrugated or surface irregular thin sheet electrodes in a batteries is a very rapid recharge and discharge ability. The entire active material region is highly accessible to both electrolyte and electronic current. It has been found that with such ultra thin microporous active material regions full recharge or discharge can be accomplished in seconds to minutes, depending on a variety of conditions such as discharge rate, depth of discharge, and method of charging, compared to hours for known lead acid batteries.

The level of stored energy available through implementation of the present invention is within the range of 0.1 to 200 W·hr (0.05 to 100 A·hr) per battery cell.

A common metric for discharge and recharge is the "C Rate." The C rate is the rate at which the total capacity of a battery is removed or restored. A 1 C rate is a one hour rate (i.e. a complete discharge or recharge in one hour). A C/20 rate is a complete discharge or recharge in 20 hours. Similarly, a 20 C rate is a complete discharge or recharge in 1/20 hour, or 3 minutes. Prior batteries are typically recharged or discharged at rates equal or slower than a 1 C rate. Prior to the present invention, a rapid recharge was considered to occur at a rate greater than 1 C. High rate discharges are usually 10 C or greater with prior battery configurations. Spiral batteries according to the present invention have been recharged at 100 C–200 C rates. Discharges have been performed at up to 450 C.

The corrugated or surface irregular thin sheet electrodes are assembled into a battery structure using conventional techniques, after electrochemical formation is completed. A bipolar battery may be constructed within the scope of the present invention by forming irregular high and low regions on thin flat sheets and electrochemically treating the sheets as explained above to form corroded regions. One side of the sheet is then reduced to a porous metal state. The plates are then assembled into a bipolar stack using conventional bipolar techniques. See FIG. 6.

Figure 14:
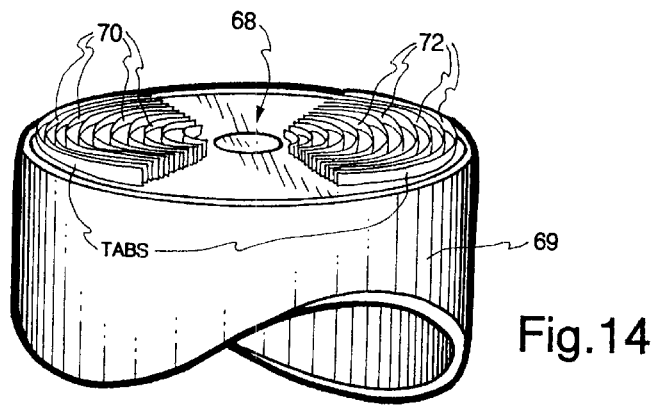
FIG. 14 is a fragmentary three dimensional schematic of a cell formed in accordance with the present invention, showing the thin sheet positive and negative electrodes respectively equipped with exposed tab extensions.
Figure 15:
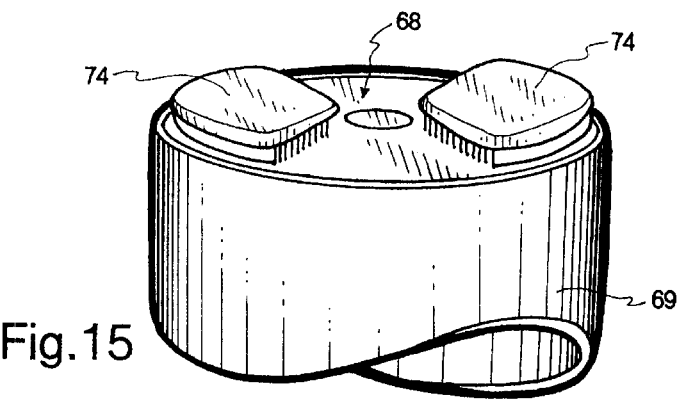
FIG. 15 is a fragmentary three dimensional schematic of the cell of FIG. 14 with the positive and negative tabs welded together.

A spirally-wound lead acid battery, using thin sheet electrodes of the present invention, is made by winding or otherwise spirally-configurated the thin sheet positive and negative electrodes separated by layers of dielectric material, called separators. Strips of lead foil may be corrugated or given irregularities comprising high and low surface regions and electrochemically treated as described. The thin electrodes are then wound into a cell roll which is inserted into a cylindrical container. See FIGS. 11 through 13. Tabs are cut before or after winding and placement in the container so as to extend upward at the top of the coil (above the active region of the electrodes). See FIG. 14. Electrolyte is added. The positive and negative tabs are respectively welded together by molten lead which become terminals of the cell. See FIG. 15.

Winding of electrodes is broadly known. See U.S. Pat. Nos. 4,158,300; 4,709,472; 5,045,086; 5,091,273; and 5,323,527. The separator material may be any suitable dielectric material. The separator material is almost always a mat made from thin glass fibers. Other materials have been used, such as polymer fiber mats, other ceramic fibers, rubbers, and various organic materials (such as certain papers). Fiberglass has proven to be the best material. Several vendors are available from which fiberglass separator material can be purchased such as Whatman and Hollingsworth & Vose.

Another option for making spirally-wound lead acid cells with thin sheet electrodes is to form the electrodes in situ. Grooved or surface irregular, unformed lead foil is wound with separator layers into a cell coil and inserted into an open cell container. The sulfuric acid/nitric acid solution is then introduced into the cell. A current is then run between the positive and negative electrodes. The electrode which is initially positive is activated by creation of a lead dioxide region or regions into the lead. After the appropriate forming time has elapsed, then the current is reversed. The electrode comprising the lead oxide regions is reduced, such that the lead dioxide corrosion regions are converted over to time to porous elemental lead. This electrode is used as the negative electrode in a battery cell. The opposite electrode at the same time is oxidized, such that porous lead dioxide regions are created. The current is continuously passed, until the opposite electrode is fully electrochemically transformed into a positive electrode comprised of porous lead dioxide regions.

The spirally-wound batteries of the invention offer power storage capacities (A·hr) which are close to or comparable to commercially available spirally-wound batteries. At the same time, the discharge and recharge capabilities significantly exceed those of conventional batteries. Additionally, the cycle life of the batteries made accordingly to the present invention materially exceeds those of prior batteries.

Nitric acid is preferably used as the lead-solubilizing agent in the sulfuric acid electrolyte. Nitric acid has the advantage (over other lead-solubilizing salts, such as the percholate species) of, after use, gradually decomposing to harmless byproducts during the formation. Rinsing is not required. The amount of nitric acid that is added to the cell initially can be metered such that enough (and typically only enough) nitrate is present to form porous layers on both electrodes of the desired depth. When the nitrate concentration drops low enough, then further development of the porous lead dioxide region is inhibited.

The electrode forming process of the present invention minimizes production cost, both in terms of electrical power consumption and time. Capital outlay is not high. The production time is approximately eighteen hours less than is required to make the pasted electrodes. Less than 2 kW·hr of electricity will be required to form the electrodes for a single (12V) module. The manufacturing footprint required for the present formation process is believed not significantly larger than the present pasted electrode processes. Accordingly, practice of the present invention will result in a robust, high power density battery which is manufacturable at low cost.

Silver oxide and zinc thin sheet electrodes with high and low surface irregularities are also of value in silver/zinc batteries. Silver/zinc batteries are commonly used by the U.S. Navy and other defense agencies, for energy storage where high energy density and power density are important, and cost is not a factor. Silver/zinc batteries can be built dry, and activated (i.e. filled with electrolyte) immediately prior to use. Sub-second fill times are sometimes important. This is often difficult with pasted silver oxide electrodes, due to the long diffusion path of the electrolyte into the interior of the thick, porous electrodes. With thin, corrugated silver oxide and zinc sheet electrodes, rapid filling is readily accomplished. Electrolyte is introduced at one end of the thin sheet electrodes, and it then courses very rapidly along the grooves of the corrugations in the thin sheet electrode. Furthermore, the grooves or low surface regions can function as mini-reservoirs for retention of immediately accessible electrolyte.

The silver-zinc batteries, as with the lead-acid batteries, can be either spirally-wound or bipolar. Each arrangement has advantages. The zinc is substituted for the lead-acid negative material (porous lead), and the silver oxide is submitted for the positive material (lead dioxide). The arrangement is otherwise essentially the same. Different separator materials are usually used (principally woven polypropylene or cellulose), although a fiberglass separator can be used for primary (non-rechargeable) batteries, used primarily by the military.

The process overtones of the invention differs from the traditional Planté process, due in large part, to implementation with the microthin sheet technology described above, to use of nitric acid with thin sheet electrodes and to reduction in cost and power requirements. The known Planté manufacturing process is limited to thick electrodes, which have unduly limited capabilities. The known Planté process is considered costly relative to pasted electrodes production, particularly in terms of power and manpower requirements. In the known process, electrodes are made by placing thick flat lead sheets in forming tank containing sulfuric acid and, most commonly, potassium perchlorate. The electrodes are electrochemically oxidized for 24 to 36 hours, resulting in a porous lead dioxide film on the surface of the lead. The current may be reversed, to reduce the lead dioxide to porous lead metal. Two electrodes are not simultaneously formed. The potassium perchlorate must be laboriously and repeatedly flushed or rinsed from the electrode pores and dried. The solution tank is then charged with sulfuric acid, without potassium perchlorate, for 24 to 72 hours prior to use. The time-intensive removal of potassium perchlorate prior to placing electrodes in the final cell is essential, so that the perchlorate does not continue to corrode the underlying electrode support material. The perchlorate ion is difficult to destroy electrochemically (its decomposition potential is around 4V relative to lead metal).

In contrast to the known Planté process, the present invention comprises a process including several key improvements to provide a vastly superior product, to minimize cost and time, and to improve reliability. Use of nitric acid and elimination of potassium perchlorate as the lead solubilizing agent in the formation of microthin electrodes. Nitric acid has been found to be significantly effective in forming the porous active material region of thin sheet electrodes. Removal from the electrode pores of spent nitric acid is not necessary, as the ion thereof gradually decomposes into a harmless form. More specifically, residual nitrate ions are entirely decomposed after the first few hours of the initial charging of the battery.

Shortening of the formation process is significant. It has been found that only 3 hours of formation is needed to develop the desired structure on the thin sheet electrodes. Use of nitric acid as the forming agent shortens the time needed to reduce the thin sheet electrodes (to form porous elemental lead metal) after initial formation of lead dioxide. The time reduction is from 24–36 hours to 3 hours (due to eliminating the need for flushing perchlorate from the pores of the electrodes). The reduction step is done in the present process not to remove the forming agent, but to prepare the positive thin sheet electrodes. For spirally-wound thin sheet electrodes, the electrodes are more durable in the lead state than in the oxidized state.

Conservation of both space and power using a continuous or semi-continuous production approach is a further benefit. For example, after initial formation, the resulting electrodes are preferably used in tandem or as counter electrodes for joint formation of thin sheet positive and negative electrodes. This reduces power and time requirements dramatically.

The result is a formation process which is approximately 6–7 hours long, and which is adaptable to automation. The electrical current requirements of the thin sheet electrode forming cost are approximately 6 A·hr per A·hr of final (six cell) battery capacity. The electrical energy cost of formation, per six-cell, 15 A·hr battery is conservatively less than 2 kW·hr. For comparison, this energy cost is significantly less than the energy required to do final charging and conditioning of the existing pasted electrode batteries, after assembly but prior to shipping.

FIG. 3 is a flow sheet comparison between one version of a spiral battery process of the invention and the prior-art pasted electrode process for making batteries. Both processes begin by preparation of materials and components. In the case of the present process, the starting material is lead foil of suitable purity, and substantially uniform thickness. The foil is then passed through automated rollers to mechanically form corrugations, i.e. an array of grooves and ridges.

For pasted electrodes, the important starting materials are the lead grid and constituents of the paste. The lead grid is made by punching holes in a lead plate of suitable purity. Commercially available lead oxides, of acceptable purity and in paste form, are obtained from a suitable vendor. The purity standards make the costs of such pastes very high.

The processes of preparing electrodes differ, as shown in FIG. 3. An expanded schematic diagram of the traditional Planté formation is shown in FIG. 4.

In contrast, pasted electrodes require approximately 24 hours to prepare. The paste is mixed, and then applied to the grid, with a pasting paper being placed on both sides of each electrode. The cell element is then wound and placed in a suitable container, such as a monoblock container.

For the pasted electrode process, the curing of the electrodes, which is subsequent to placing the cell elements in the container, is the most energy and time-intensive step. An unsealed monoblock is placed in a high temperature oven, with controlled humidity, for approximately 24 hours. During this time, water is removed, and chemical reactions occur in the electrodes which prepare them to accept a charge later in the fabrication process.

After winding and curing, the processes will be essentially the same. The thin sheet electrodes of the invention can be final charged in 24–48 hours, as compared to 72 hours for pasted electrodes.

In summary, the energy required for production of the two different batteries is comparable. The time required for making batteries using the present process is approximately 18 hours less than the present pasted electrode processes.

EXAMPLES

The following examples demonstrate the production of bipolar electrodes and spirally-wound electrodes for lead-acid batteries. The resulting battery in each case is particularly suitable for use in HEVs. Joint studies by the HEV program by Department of Energy and various automotive manufacturers have demonstrated that, while the existing battery designs approach most requirements for HEVs, there is still a serious difficulty in meeting the requirements for peak discharge power and regeneration power. The power limitations are even more pronounced when considered for use in parallel-configured hybrid vehicles of FIG. 2. These vehicles require a battery pack which is smaller in size, and yet can be both discharged and recharged at rates comparable to those specified for the series-configured hybrid of FIG. 1.

The limitations in power are not due to the fundamental electrochemistry of the battery systems, but instead are due to the configurations and constraints of prior batteries, particularly the electrodes.

Example I
Bipolar Battery

In general, a bipolar battery of this invention comprises bipolar electrodes, with separator layers placed between electrodes which are laid upon one another like a stack of pancakes. A bipolar electrode of a thin, flat conductive material (such as a metal foil), with a positive active electrode material deposited on one face, and a negative electrode placed on the opposite face. A bipolar cell comprises the positive electrode side of one bipolar electrode, the negative electrode side of a second closely spaced bipolar electrode and the electrolyte between the two. On the ends of the battery are placed single-sided (monopolar) electrodes. Each individual cell is normally sealed to prevent electrolyte leakage.

This example demonstrates the manufacture and performance of bipolar electrodes made in accordance with the present invention. For comparison purposes, a conventional bipolar electrode is illustrated in FIG. 5. The bipolar electrodes of the invention can be discharged and recharged at very high rates. The electrode configuration has been developed to assure that electrode active material (lead dioxide or porous lead) is highly accessible both ionically and electronically. Prototype electrodes were made by cutting large numbers of small parallel grooves and ridges or forming other high and low surface regions in thin lead sheets, and then electroforming the irregular regions of the thin lead sheets using the process described above, to create a surprisingly large and uniform amount of active material. See FIG. 6. The metal solubilizing agent comprises sulfuric and nitric acids. The resulting bipolar electrodes were then used to assemble a battery in using conventional techniques aside from the electrodes.

Prototype bipolar batteries using the present microthin sheet technology were assembled and tested. These prototype batteries not only exceeded existing standards for electric vehicle discharge power, but met the regeneration power requirements as well.

Figure 6:
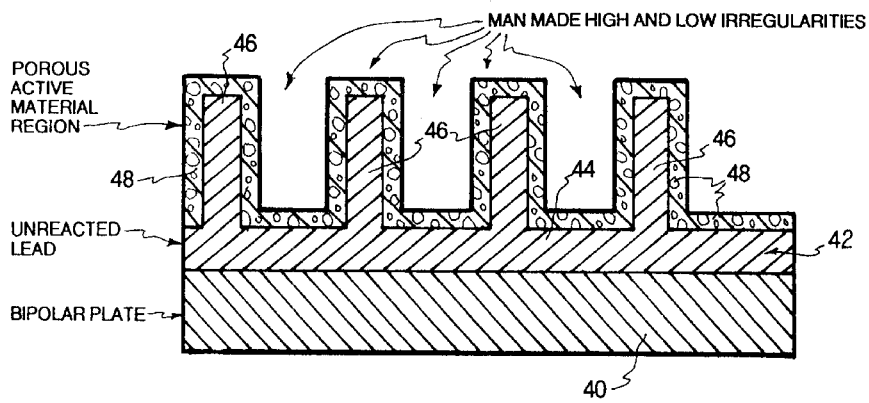
FIG. 6 is a cross-sectional schematic of a bipolar electrode formed in accordance with principles of the invention.

With reference to FIG. 6, bipolar plate 40 is shown, which plate merges with a core 42 of unreacted lead.

The unreacted lead core 42 is a thin sheet comprising a substantially concealed base 44 contiguous with one surface of the bipolar plate 40. Core 42 also comprises concealed rectangularly shaped ridges or ribs 46. Core 42 is essentially a backbone supporting the active regions of the thin electrode. The porous active regions 48 collectively are undulating and comprise a porous layer over the ribs or ridges 46 and the grooves between the ribs or ridges 46. The porous active regions 48 covers the entire surface of the core corrugations and are uniformly corroded.

While the corrugation may comprise ridges and grooves which are rectangular in cross sections, other cross-sectional shapes can be used. Cross-hatched patterns, stamped into the metal, can be used. Repeating and non-repeating surface irregularities may be used.

Example II
Spirally-Wound Battery

This example demonstrates the manufacturing viability and performance characteristics of a spirally-wound battery made in accordance with the present invention. This configuration of the invention meets all of the power requirements of the HEVs, both series and parallel-configured.

Electrodes were made by taking strips of corrugated lead sheet and electroforming the corrugated lead using a process embodying the principles of the invention. See FIG. 11. The electrodes were then sandwiched with strips of separator material, and the combination spirally wound into a cylindrical shape. See FIG. 12. After placing the roll into a cylindrical container (FIG. 13) and making appropriate electrical connection, electrolyte was placed in the cell and the cell was sealed.

The lead sheets were given high and low surface irregularities. Lead foil may be passed through rollers with small parallel ridges in their surfaces to create corrugations by forming grooves in the lead foil. Alternately, the lead foil may be stamped with a die defining the desired surface irregularities, or engraved, or scratched or scored to create low and high regions.

For this example, thin lead sheets were scored by scratching using emery paper to create small irregular grooves and ridges. This less preferred procedure was expected to produce the cells having a lower capacity than thin sheets carefully die pressed, grooved, or engraved. Lead foils of 0.010 and 0.016 inch thickness were used. Formation of the electrodes by the above-described process was carried out in polypropylene tanks approximately 30 inches long, 8 inches tall, and six inches wide.

Figure 11:
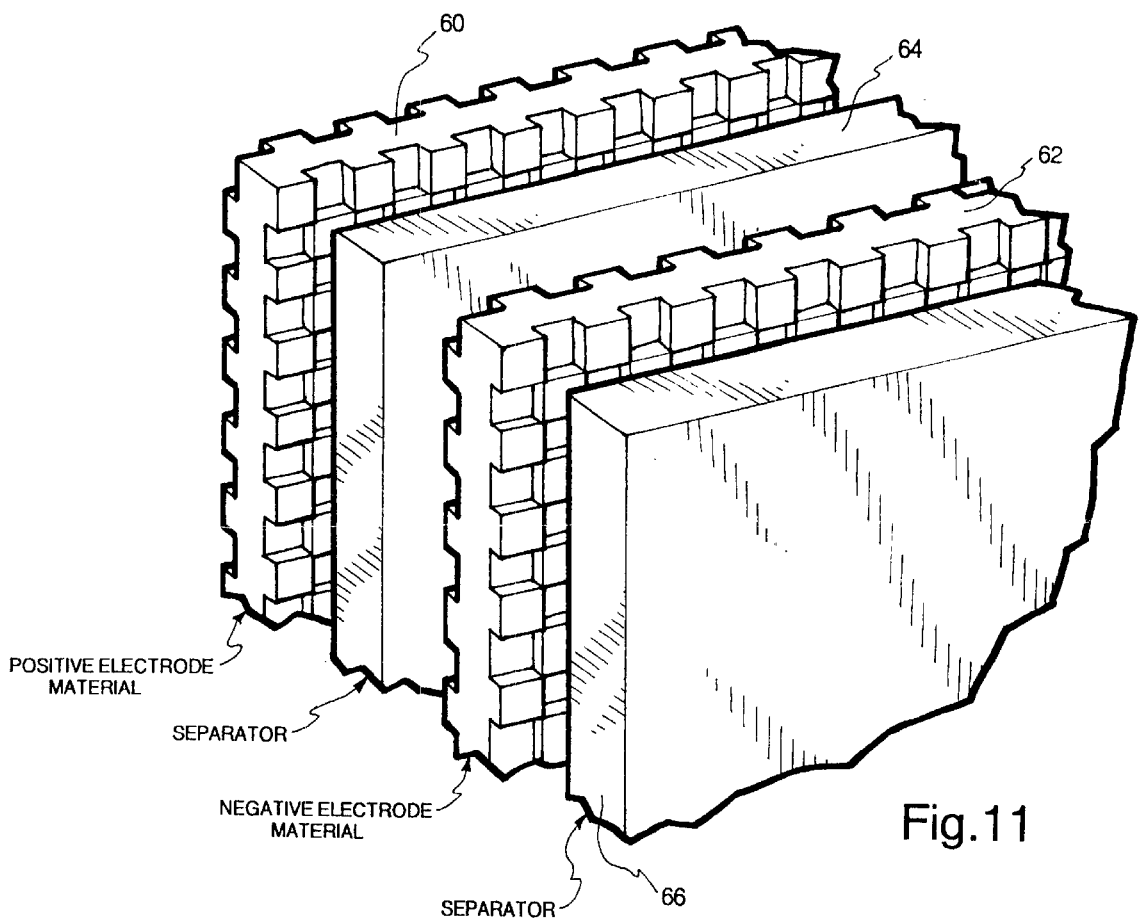
FIG. 11 is a three dimensional schematic showing thin sheet positive and negative electrodes, made in accordance with the present invention, and two separator dielectric layers preparatory to spirally winding the four layers.

Two layers of 0.004 inch separator from Hollingsworth and Vose (Hovosorb II™) were used between the electrodes, in the manner shown in FIG. 11. Sulfuric acid of 5M concentration (1.28 g/cm$^3$) was used as the electrolyte.

Figure 16:
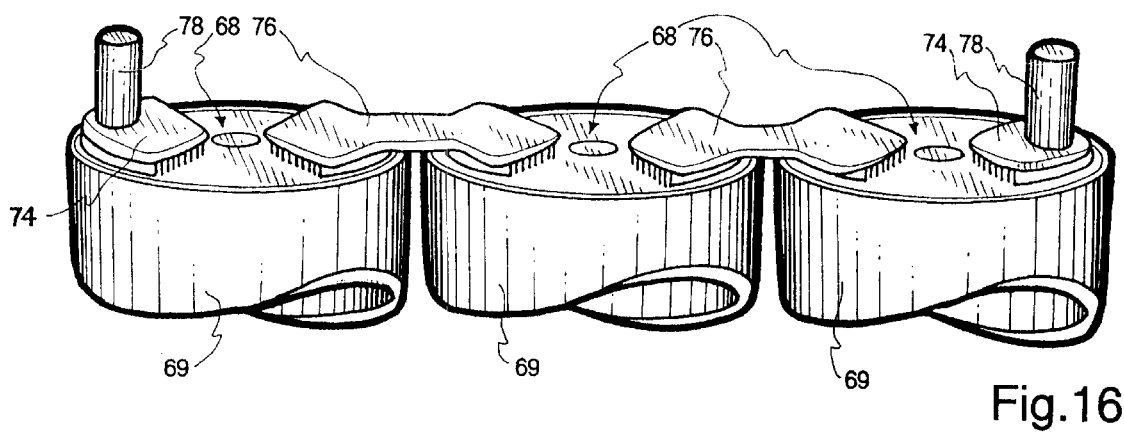
FIG. 16 is a fragmentary three dimensional schematic of the cell of a battery pack comprising three cells of the type shown in FIG. 15 electrically connected in series with monoblack posts or terminals attached.

Both positive and negative electrodes were completely formed of thin sheets using the above-described process. After formation, the active regions of each positive electrode was reduced to a porous elemental lead state. The electrode capacity was 14 C/cm$^3$. Tabs 70 and 72 were cut in the thin metal electrodes windings, in the manner shown in FIG. 14. More specifically, the thin sheet electrodes are formed with excess bare metal (lead metal) at the top. After forming the active material, most of the bare metal at the top is cut away, except for placed where tabs are needed. When the cell is wound, all of the tabs for the positive electrode line up together on one side of the cell and those for the negative line up on the other side. These tabs are then lead welded together. Finally, intercell straps and posts are attached. The collection of four layer or cell wrap (FIG. 11) was rolled by hand to the state shown in FIG. 12, and placed in a cylindrical cell container 69. Terminals were made by inventing the cell wrap and immersing the downwardly extending lead tabs 70 and 72 into two small forms each filled with molten lead. One form of terminal is shown at 74, in FIG. 15. Two other terminal forms are shown in FIG. 16, i.e. bridging terminals 76 and terminal posts 78. A monoblock is a battery. Several individual cells are placed in a single case or package. A monoblock usually consists of three cells, although six cells are also commonly used. In a battery pack containing many cells (and therefore high voltages), it is convenient to build the pack from several batteries containing the same number of cells. In a hybrid vehicle, a total voltage of around 360 V (at open circuit) is common. A pack is assembled from, for example, 60 monoblocks, each operating at a nominal voltage of 6V, containing three lead-acid cells of 2V each. Therefore, monoblock contains three-cells are convenient.

Electrolyte at ambient temperature was injected into the cell with a syringe. The cell was charged for 24 to 36 hours. The containers were monoblock cases obtained from Optima Batteries, Inc., and of a size used for Optima's HEV programs.

These prototype cells were tested and found to have had a capacity of 3 to 5 A·hr. This capacity is below the capacity for cells that are constructed from lead foil grooved with rollers, which have a capacity of 12 to 13 A·hr, but nevertheless proved the viability of the thin sheet technology. This value was obtained by using the measured value of specific electrode capacity (35 C/cm$^3$), for non-spiral electrodes using the desired roller grooved structure, multiplying by the electrode area, and correcting for the under-used portions of the thin sheet electrodes (i.e. the outer and inner wraps).

Figure 8:
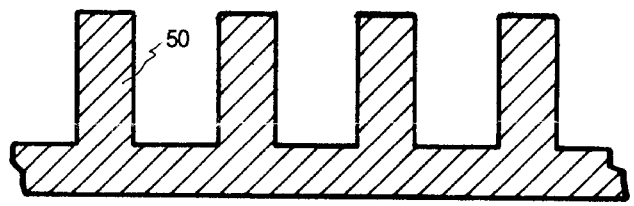
FIG. 8 is a cross-sectional schematic of a lead blank having man made high and low irregularities from which an electrode according to the present invention may be formed.

Reference is now made to FIGS. 8 and 10 through 13, which are schematic diagrams illustrating the steps by which spirally wound batteries of the invention are made. FIG. 8 illustrates an untreated thin corrugated sheet 50 from which a thin sheet electrode according to the present invention is formed. An electrochemically-treated electrode 52 is shown in FIG. 10 which comprises an untreated metal support back bone comprised of a base 54 and spaced ridges or ribs 56. Groove width prior to electroforming, was within the range of 2–20 mils. It should be noted that during electroforming, the groove width decreases due to creation and expansion of porous active material on the walls of the ridges (i.e. the top and side of the ridges). The grooves often will close entirely with oxidized material. This configuration with grooves which are entirely filled is also of considerable value, as the useful active material thickness of the electrode can be much greater than conventional Planté electrodes.

Cutting low regions in the surface of lead, which are later filled due to oxidation of the lead ridges, results in a higher porosity at the back of the active material region. This happens because the active material has somewhere to go as it forms. In other words, the volume constraints are less severe when low regions are formed in the lead, so that higher porosity can develop deep and uniformly porous active material regions. In addition to the improved microporosity, the uncorroded lead at the center of the lead ridges acts as a path for electronic current flow during electrode operation. Thus, resistance to electronic current is reduced in such electrodes, relative to active material regions which do not contain these thin ridges of lead. This improved current collection is important. A major limitation of existing lead acid batteries, used in HEVs, is solid-phase voltage drop which occurs in the positive electrodes during high current use.

Figure 12:
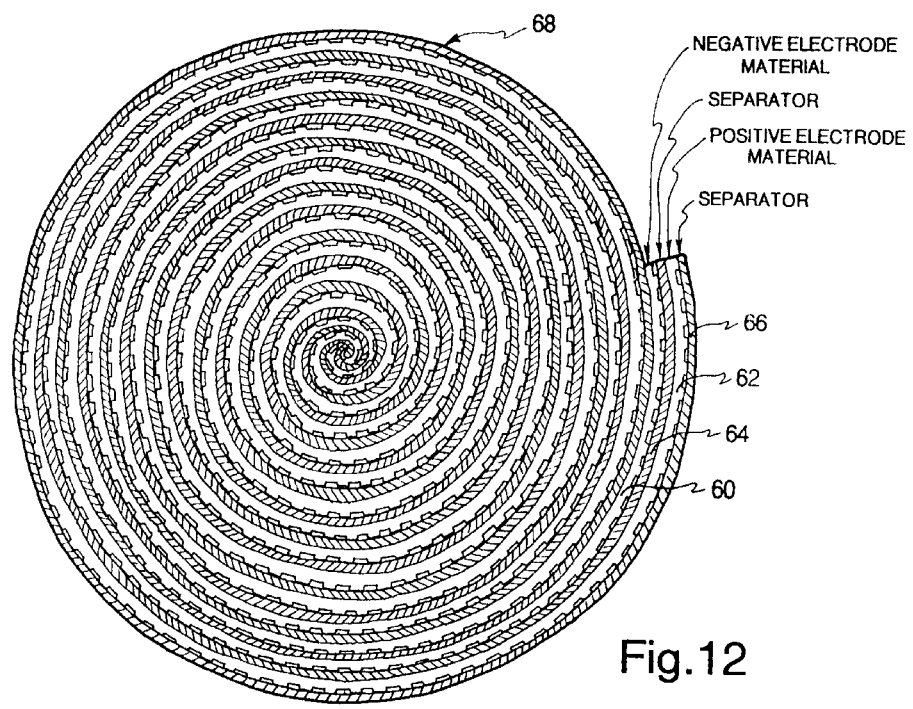
FIG. 12 is a top plan schematic of the four layers of FIG. 11 rolled into a tight spiral coil.
Figure 13:
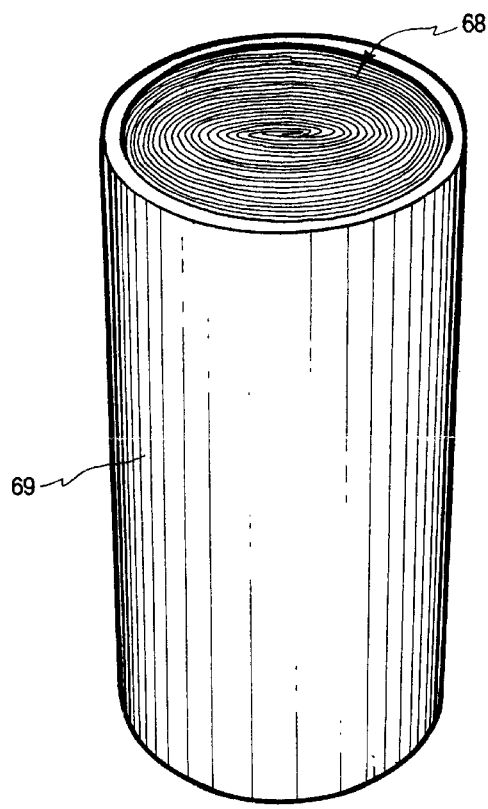
FIG. 13 is a three dimensional schematic showing the coil of FIG. 12 placed in a container to form a cell.

In FIG. 11, one positive electrochemically-formed thin sheet electrode 60 and one negative electrochemically formed thin sheet electrode 62, are aligned together with two separator sheets 64 and 66 (FIG. 11) and tightly spirally wound into a coil 68 (FIG. 12). As wound, the coil comprises, seriatim, the positive electrode 60, the separator sheet 64, the negative electrode 62, and separator sheet 66. The coil 68 is then placed into a suitable cylindrical container 69 (FIG. 13). Electrical connections and posts and terminals are added, as is a suitable electrolyte as explained above.

Figure 17:
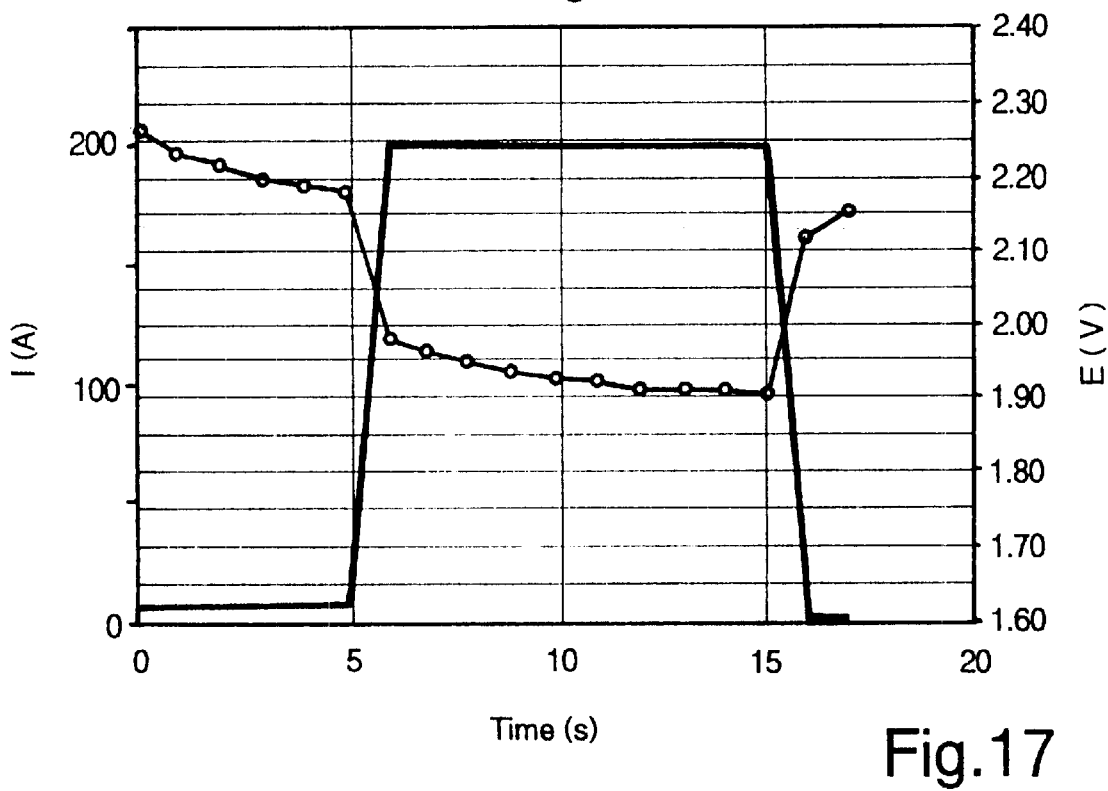
FIGS. 17 and 18 are a graph showing performance data derived from batteries produced in accordance with the principles of the present invention.
Figure 18:
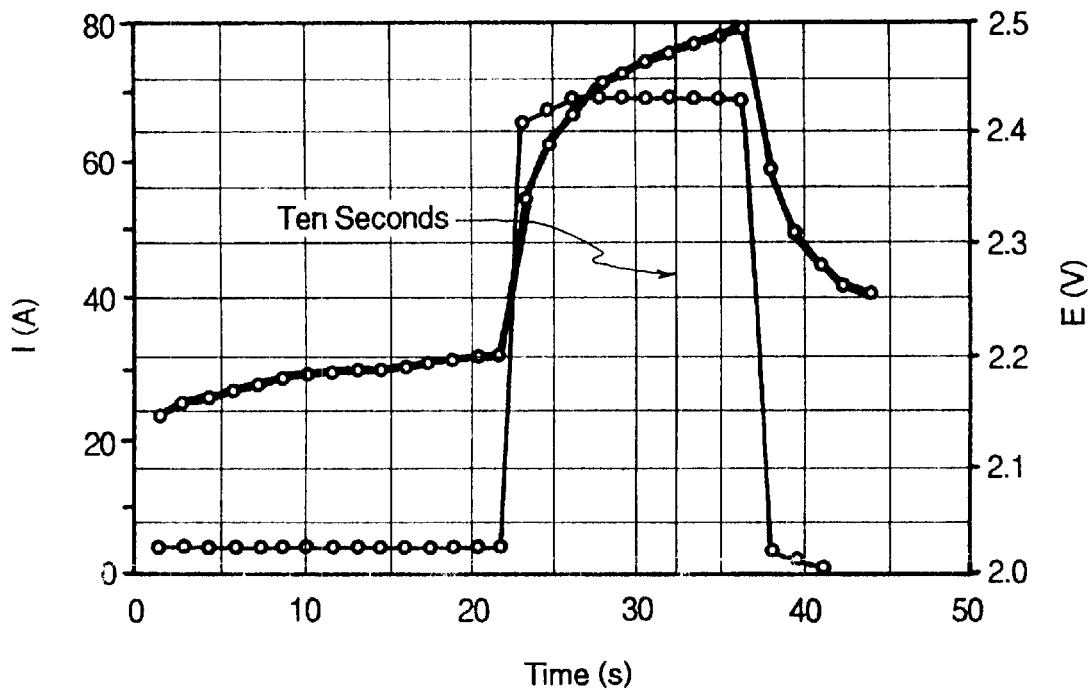

Tests were made for discharge and recharge power on these open top crudely-made cells. The data for one of the cells is shown in FIGS. 17 and 18. The results were excellent and demonstrated the principles of this invention, notwithstanding deterioration of the cells due to the fact that the cells were open for an extended period while being transported to a testing facility. At the time of these tests, the capacity had deteriorated to a capacity of 1 to 2 A·hr. A 200 A discharge from the 1 to 2 A·hr cell was sustained for seconds at cell potentials greater than 1.9 V. The recharge capabilities were also good. At approximately 50% state of charge, a 70 A recharge was done for 15 seconds, during which the potential reached a maximum of 2.5 V. After 10 seconds, the potential was 2.475 V.

Thus, a battery pack containing 172 cells (344 to 370 V nominal voltage) would provide a pack voltage of 426 V. The regenerative power imperative for a HEV is that the battery pack must be able to absorb approximately 0.25 A·hr in ten seconds, at a total voltage of less than 430 V. This prototype cell nearly achieved this value, absorbing 0.194 A·hr during this time, despite having a total capacity of less than 2 A·hr. A full recharge can be accomplished in less than a minute, if necessary. A healthy cell, such as one with a roller-grooved thin sheet electrode, that is sealed, that is in a non-deteriorated condition, and that has been subjected to good cell conditioning, will meet or exceed various HEV imperatives. The stack impedance for these cells was significantly less than that of existing batteries.

The present technology provides the improvements over the prior art, including but not necessarily limited to:

1. Higher Discharge Power Sufficient to surpass program imperatives for peak discharge power and energy efficiency;
2. Higher Recharge Power Sufficient to meet imperatives for either the parallel or series-configured hybrid vehicles;
3. Lower Heat Evolution;
4. Ease of Manufacture Both the spiral cell manufacturing process is well established.

The Planté process is adopted to the electrodes proposed and modified to lower costs and ease manufacturing.

5. Low Cost-None of the processes involved require exotic and expensive equipment.
6. Batteries according to the present invention are expected to have a long life. The thin sheet electrode eliminates grid corrosion, a common source of failure of lead acid batteries. Batteries of this invention can last as long as twenty years, more than twice as long as other types of lead acid batteries.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed and desired to be secured by Letters Patent is:

1. A method of making a battery comprising an electrode comprising the steps of corrugating and corroding at least one side of a one piece microthin sheet of metal having a thickness within the range of 4–62 mils while increasing the exposed porosity at the at least one side of the one piece followed by wrapping the one piece microthin metal sheet into a spiral configuration together with a second electrode and a separator layer between the electrodes, the increasing step comprising expanding of the one piece metal sheet being corroded into vacant spaces between corrugations.

2. A method according to claim 1 wherein the corrugating step comprises creating parallel microgrooves in the at least one side of the one piece microthin sheet.

3. A method according to claim 2 wherein the width of each microgroove is within the range of 2–20 mils, the depth of each groove is within the range of 2–20 mils, and the spacing between consecutive grooves is within the range of 4–40 mils.

4. A method according to claim 1 wherein the corrugating step comprises creating microsized ridges and microsized grooves at both sides of the one piece microthin metal sheet.

5. A method according to claim 1 wherein the corroding step comprises exposure of at least one side region to solubilizing agent for the metal comprising the one piece microthin sheet while applying electrical current to the one piece microthin metal sheet.

6. A method according to claim 1 wherein the one side region comprises an electrochemically treated surface of the one piece to provide a higher magnitude of microporosity.

7. A method according to claim 1 wherein the wrapping step comprises placing the one piece microthin corrugated corroded metal sheet contiguous with the separator layer and jointly rolling the sheet, the separator layer, and the second electrode tightly together.

8. A method according to claim 7 further comprising the step of placing the tightly rolled sheet and separator layer in a cylindrical container.

9. A method according to claim 8 further comprising the step of adding electrolyte to the interior of the container using the corrugations as flow paths for the electrolyte.

10. A method according to claim 8 further comprising the step of electrically connecting the one piece microthin corrugated corroded metal sheet to a terminal associated with the container.

11. A method according to claim 1 further comprising placing a bipolar electrode conductively contiguous with the one piece microthin metal sheet.

12. A method according to claim 1 wherein the one piece microthin metal sheet comprises and the corroding step comprises creating lead oxide on lead of the one piece microthin metal sheet using acid.

13. A method according to claim 12 wherein the acid comprises nitric acid as a lead solubilizing agent.

14. A method according to claim 12 wherein the lead is simultaneously exposed to the acid and a selective flow of electrical current to create active lead dioxide material.

15. A method according to claim 14 wherein the flow of electrical current is selectively reversed to transform electrochemically-created lead dioxide into porous elemental lead comprising an integral part of the one piece microthin metal sheet.

16. A method according to claim 1 wherein the corroding step comprises corroding an elevated crown and edge regions of each outward corrugation to a desired depth leaving a concealed untreated microthin non-corroded portion of the one piece for support.

17. In a method of making a lead acid battery, the steps of providing a thin sheet of lead having a thickness of 62 mils or less and corroding at least one side of the thin sheet of lead using nitric acid as a solubilizing agent in lieu of potassium perchlorate in the presence of sulfuric acid.

18. In a method according to claim 17 further comprising the steps of leaving the nitric acid on the at least one side of the thin lead sheet without rinsing after the corroding step followed by assembling the thin lead sheet into the lead acid battery.

19. In a method of making a bipolar battery, time steps of: corrugating and corroding at least one side of a one piece microthin sheet of metal having a thickness no greater than 62 mils to increase the exposed porosity thereof and placing the one piece microthin metal sheet in electrical communication with a bipolar electrode.

20. A method of providing a high capacity electrode for a battery comprising the steps of corrugating and electrochemically corroding both sides of a microthin sheet of metal having a thickness no greater than 62 mils and no less than 4 mils, materially increasing bi-surface porosity, accommodated by expansion into vacant spaces between corrugations.

21. A method of providing a high capacity electrode for a battery comprising the steps of electrochemically corroding both sides of a one piece microthin sheet of metal having a thickness no greater than 62 mils, materially increasing bi-surface porosity and wrapping the one piece microthin metal sheet together with a second electrode into a spiral configuration.

22. A method of simultaneously forming both positive and negative battery cell electrodes comprising the steps of placing one piece microthin metal electrodes each having a thickness no greater than 62 mils in a container in the presence of nitric acid and driving current through the container first in one direction and then in the opposite direction to respectively electrochemically form integral porous elemental metal and integral oxidized metal on the negative and positive electrodes, respectively.

* * * * *